United States Patent Office 3,424,736
Patented Jan. 28, 1969

3,424,736
DIENE POLYMERIZATION PROCESS AND
CATALYST THEREFOR
Walter Nudenberg, West Caldwell, Dudley Bruce Merrifield, Basking Ridge, and Edward Axel Delaney, Morris Plains, N.J., assignors to Texas-U.S. Chemical Company, Port Neches, Tex., a corporation of Delaware
No Drawing. Continuation-in-part of abandoned application Ser. No. 288,877, June 19, 1963, which is a continuation of application Ser. No. 38,417, June 24, 1960. This application Dec. 5, 1966, Ser. No. 599,671
U.S. Cl. 260—94.3   12 Claims
Int. Cl. C08d 1/14, 1/16, 3/08

ABSTRACT OF THE DISCLOSURE

A process for the controlled orientation polymerization of butadiene characterized by contacting the butadiene in a solvent with catalyst consisting of the components (1) Grignard composition reacted with (2) a titanium tetrahalide in (3) a complex form under conditions such as the titanium is maintained tetravalent, for a time and at a low temperature, sufficient to induce completion of polymerization, and thereafter recovering the polymer.

---

This invention relates to a process for polymerizing butadiene to produce cis-polybutadiene of controlled 1,4 structure. More particularly, this invention is directed to a process for polymerizing butadiene to polybutadiene of cis-1,4 structure employing a novel catalyst and to methods of preparation of this novel catalyst.

The subject application is a continuation-in-part of our commonly-assigned, copending application Ser. No. 38,417, filed June 24, 1960, now abandoned, and a continuation of our application Ser. No. 288,877 filed June 19, 1963, now abandoned.

Conjugated diolefin polymers of controlled structure have been prepared with catalyst systems comprising mixtures of aluminum alkyls and titanium tetrahalide. Cis-1,4 polybutadiene prepared with aluminum alkyl-titanium iodide catalyst systems have recently been made available in commercial quantities and are being widely used as blending agents for SBR and natural rubber. A serious limitation of the aluminum alkyl system is its temperature sensitivity. At polymerization temperature above 20° C., the cis content of the polymer decreases and molecular weight control is difficult to attain with aluminum alkyl systems. Aluminum alkyl-titanium halide catalyst systems and other catalyst systems containing titanium halides in combination with reducing agents are useful for the polymerization of olefins such as ethylene and propylene. In these catalyst systems the active catalyst component is said to require solid $TiX_3$ or some other reduced form of titanium in which the titanium is in a valence state of 3 or below. Various metal alkyls and metal hydrides such as aluminum alkyls, dialkyl magnesium compounds, dialkyl zinc compounds, Grignard reagents, lithium hydride, etc. are used to reduce the titanium tetrahalide to a valence state below 4, that is, to a valence state of 2 or 3. The subject invention involves the discovery that reduced forms of titanium halides containing titanium in a valence state below 4 in admixture with organomagnesium compounds are completely inactive for cis polymerization of butadiene and that polymerization of butadiene to a polymer of cis 1,4 structure is effected with a catalyst containing titanium essentially in a tetravalent state and prepared by reaction of an organomagnesium compound, titanium tetrahalide and butadiene.

In accordance with this invention, polybutadiene having a cis content above 70% is prepared by polymerizing butadiene in a solvent at a temperature between −10 and 90° C. with a catalyst containing titanium essentially in the tetravalent state and prepared by reaction of an organomagnesium compound, titanium tetrahalide and butadiene. The active catalyst for cis-polybutadiene manufacture produced by the reaction of an ether-free organomagnesium compound, titanium tetrahalide and butadiene is a free radical having the formula $C_4H_6TiX_3 \cdot$, wherein X is halogen, or a reaction product thereof having the formula $TiX_3C_4H_6$—$C_4H_6TiX_3$ or the formula $TiX_3C_4H_6TiX_3$. The reaction product $TiX_3C_4H_6$—$C_4H_6TiX_3$ is a dimer of the $C_4H_6TiX_3 \cdot$ free radical while the reaction product

is formed by reaction of the $C_4H_6TiX_3 \cdot$ free radical with a $TiX_3 \cdot$ free radical.

A feature of this invention involves the use of a $C_3$–$C_6$ monoolefin as a component of the solvent mixture in which the butadiene polymerization is effected. The use of $C_3$–$C_6$ monoolefins which have high heat capacity as cosolvents with an aromatic hydrocarbon solvent has the advantage of reducing the solution viscosity with the result that it is possible to obtain better heat transfer during the polymerization and to continue the polymerization to a higher solution solids content. The use of a $C_3$–$C_6$ monoolefin as a cosolvent also results in the formation of cis-1,4 polybutadiene with less tendency to flow during storage and having a narrow molecular weight range. Another advantage resulting from the use of the $C_3$–$C_6$ monoolefin as a cosolvent with an aromatic hydrocarbon solvent is increased catalyst efficiency. Employing $C_3$–$C_6$ monoolefins as cosolvents, it is possible to reduce the catalyst requirement by ⅓ to ½ of that required if the polymerization process of the invention is effected in a solvent consisting of aromatic hydrocarbons. It is not feasible to substitute alkanes for the $C_3$–$C_6$ monoolefins as cosolvents because their use results in substantial insolubility of the active catalyst resulting from the reaction of the organomagnesium compound, titanium tetrahalide and butadiene and a corresponding decrease in catalyst effectiveness.

The preferred monoolefin cosolvent is isobutylene but other monoolefins such as propylene, butene-2, pentene-1, pentene-2, 2-methyl butene-2, hexene-1, 3-methyl pentene-2, 2-ethyl butene-2 and mixtures thereof can be employed as the cosolvents with the aromatic hydrocarbons. The $C_3$–$C_6$ monoolefin cosolvent is employed in a concentration equivalent to 0.2 to 1.0 volumes per volume of aromatic hydrocarbon solvent. In order to prevent formation of cis-polybutadiene-olefin copolymers, the concentration of the $C_3$–$C_6$ cosolvent should not exceed approximately five times the concentration of the butadiene monomer. As disclosed in our copending application Ser. No. 163,855, filed Jan. 2, 1962, abandoned and continued as Ser. No. 473,497, issued Dec. 19, 1967 as U.S. Patent 3,357,960, cis-polybutadiene-isobutylene copolymers are formed using the catalyst obtained by reaction of an organomagnesium compound, titanium tetrahalide and butadiene employing a monomer reaction mixture containing 5 or more volumes of isobutylene per volume of butadiene.

The organomagnesium compound, which reacts with butadiene and titanium tetrahalide to form the active catalyst containing tetravalent titanium, has the formula $RMgX$ or $R_2Mg$ wherein R is a hydrocarbyl radical containing 1 to 30 carbon atoms and X is a halogen which may be either chlorine, bromine, iodine or fluorine. The R radical is preferably an alkyl or aryl hydrocarbyl radical containing 6 or more carbon atoms and the X is preferably iodine, bromine or chlorine in the $RMgX$ formula. Examples of the organomagnesium compounds which react with butadiene and titanium tetrahalide to form the $C_4H_6TiX_3\cdot$ free radical which catalyzes butadiene polymerization are the following:

Effective Grignard reagents are dodecyl magnesium iodide, dodecyl magnesium bromide, stearyl magnesium iodide, ethyl magnesium bromide, ethyl magnesium iodide, methyl magnesium iodide, nonyl magnesium iodide, naphthyl magnesium bromide, phenyl magnesium bromide, phenyl magnesium chloride, tolyl magnesium bromide, n-octyl magnesium iodide, t-octyl magnesium bromide, hexadecyl magnesium chloride and propargyl magnesium bromide.

Effective dihydrocarbyl magnesium compounds are didodecyl magnesium, diphenyl magnesium, di-tolyl magnesium, di-2-ethylhexyl magnesium, di-naphthyl magnesium, phenyl naphthyl magnesium and phenyl benzyl magnesium.

Titanium tetrahalides employed in preparing the active free radical $C_4H_6TiX_3\cdot$ catalysts and its reaction products are exemplified by the following: titanium tetraiodide, titanium tetrabromide, titanium tetrachloride, titanium tetrafluoride, mixtures thereof and also mixed titanium tetrahalides such as titanium dichloride diiodide, titanium dibromide diiodide and titanium monobromide triiodide. The titanium iodides are preferably used when a high cis content polymer is a desired product of the butadiene polymerization as will be pointed out hereafter.

The formation of the active catalyst, the $C_4H_6TiX_3\cdot$ free radical or its reaction products, is effected by reaction of organomagnesium compound, titanium tetrahalide and butadiene in a solvent in the following proportions: titanium tetrahalide—1 mol; organomagnesium compound—0.1–10 mols; butadiene—a minimum of 300 mols and preferably at least 500 mols per mol of titanium tetrahalide reactant. When the organomagnesium compound, titanium tetrahalide and butadiene are reacted in the prescribed mol ratios, reduction of the titanium to a lower valence state by the organomagnesium compound is prevented and there is produced the active catalyst, the $C_4H_6TiX_3\cdot$ free radical or its reaction products, wherein the titanium is maintained essentially in the tetravalent state.

If the organomagnesium compound is a dihydrocarbyl magnesium compound, the mol ratio of dihydrocarbyl magnesium compound to titanium tetrahalide in the catalyst-forming reaction mixture should fall between 1:1 and 5:1 and preferably between 1:1 and 2:1 in order to obtain high cis content polybutadiene. If the organomagnesium compound is a Grignard reagent, the mol ratio of Grignard reagent to titanium tetrahalide in the reaction mixture should fall between 2:1 and 10:1 and preferably between 2:2 and 4:1 in order to obtain high cis content polybutadiene.

A requirement for the production of polybutadiene having a cis content above 85% is that iodine be a component of the catalyst. The iodine is usually introduced in the form of titanium iodide or as an iodo Grignard reagent. Apparently the presence of iodine in the catalyst system exerts a directing influence on the polymerization reaction with the resulting production of a high cis content polymer. Iodine is most conveniently incorporated in the catalyst system in the titanium tetrahalide component when high cis content polymers are desired.

The polybutadiene formed employing the $C_4H_6TiX_3\cdot$ free radical catalyst or reaction products thereof in which the titanium is essentially in a tetravalent state comprises 70–98% cis content, 1.5–30% trans content and 0.5–5% vinyl polymer formed by 1,2 polymerization of butadiene. A polybutadiene having a cis content above 85% and usually above 90% is produced if the catalyst system contains iodine and if organomagnesium compound and titanium tetrahalide are present in prescribed mol ratios in the butadiene, organomagnesium compound, titanium tetrahalide reaction mixture.

The concentration of catalyst recommended for use in the butadiene polymerization process of this invention is best expressed in mols of total catalyst, i.e. mols of titanium tetrahalide plus mols of Grignard compound, per mol of butadiene reactant. The broad catalyst concentration on this basis falls between 0.00001 and 0.01 mol of catalyst per mol of butadiene with catalyst concentrations between 0.00001 and 0.004 mol of catalyst per mol of butadiene being recommended.

The preferred procedure for preparing a $C_4H_6TiX_3\cdot$ free radical catalyst and its reaction products in which titanium is essentially in the tetravalent state is the "in situ" procedure in which the organomagnesium compound and titanium tetrahalide are contacted in a hydrocarbon mixture containing the butadiene reactant. Usually the organomagnesium compound is dispersed and/or dissolved in a mixture comprising butadiene and hydrocarbon solvent and a hydrocarbon solution of titanium tetrahalide is added to the mixture comprising butadiene, organomagnesium compound and solvent. As pointed out previously, the organomagnesium compound-titanium tetrahalide-butadiene reaction mixture contains butadiene monomer in amount equivalent to at least 300 mols and preferably at least 500 mols of butadiene per mol of titanium tetrahalide reactant. The use of the butadiene reactant in such large mol excess assures the production of the active $C_4H_6TiX_3\cdot$ free radical catalyst and prevents reduction of the titanium halide by the organomagnesium compound to an inactive solid polymeric trihalide in which titanium is essentially in the trivalent state.

This procedure is characterized by high catalyst efficiency, excellent reproducibility and insensitivity to dilution, temperature or aging effects. This "in situ" method of preparing the active catalyst also provides greater ease of catalyst handling and better process control of the polymerization rate and of the molecular weight distribution of the butadiene polymer.

Three alternate procedures are also available for preparing the active $C_4H_6TiX_3\cdot$ free radical catalyst. These procedures are employed when the organomagnesium compound and titanium tetrahalide reactants have been premixed prior to contact with the butadiene reactant. The first two techniques involve procedures for preventing reaction between the organomagnesium compound and titanium tetrahalide to reduce the titanium to an inactive trivalent state prior to the introduction of the butadiene reactant required for the preparation of the active $C_4H_6TiX_3\cdot$ free radical catalyst or a reaction product in which the titanium is essentially in the tetravalent state. The remaining procedure involves an oxidation reaction whereby an organomagnesium compound-titanium tetrahalide reaction mixture which contains titanium essentially in the trivalent state, which does not react with butadiene when added thereto to form an active catalyst, is converted to a form which reacts with butadiene reactant to form the active catalyst.

The first procedure for preventing formation of reaction between organomagnesium compound and titanium tetrahalide prior to introduction of butadiene reactant involves addition of the organomagnesium compound and titanium tetrahalide to a hydrocarbon solvent at a temperature below 0° and maintaining the resulting mixture below this temperature until the butadiene reactant is added thereto.

The second procedure for preventing reaction between the organomagnesium compound and titanium tetrahalide prior to the addition of the butadiene reactant involves adding the organomagnesium compound and titanium tetrahalide to a hydrocarbon solvent in the form of a slurry containing a minimum concentration of 10 weight percent of these two reactants. Preferably the concentration of the organomagnesium compound and titanium tetrahalide in the hydrocarbon slurry is above 15 weight percent thereof. Reaction between the organomagnesium compound and titanium tetrahalide is substantially prevented in the concentrated slurry because of the lack of mobility of the reagents. On contacting the butadiene with the slurry, the active $C_4H_6TiX_3\cdot$ free radical catalyst is formed.

The procedure for restoring an inactive catalyst system in which the titanium is in a valence state below 4 involves addition of a hydrocarbon-soluble oxidizing agent to a mixture comprising the inactive organomagnesium compound-titanium tetrahalide reaction product and butadiene reactant in the prescribed mol excess.

The reaction between organomagnesium compounds and titanium tetrahalide and butadiene to form the active catalyst $C_4H_6TiX_3\cdot$ free radical is represented by the following equations:

Equations A and B represent the initial reaction between the organomagnesium compound and titanium tetrahalide to form a catalyst precursor $RTiX_3$ which is converted by reaction of the prescribed mol excess of butadiene reactant to $C_4H_6TiX_3\cdot$.

(A) $\quad RMgX + TiX_4 \longrightarrow RTiX_3 + MgX_2$ $\quad\quad RMgR + TiX_4 \longrightarrow \underbrace{RTiX_3}_{\text{Precursor}} + RMgX$ The catalyst precursor $RTiX_3$ is converted to the active $C_4H_6TiX_3\cdot$ free radical catalyst as shown in over Equation C.

(C) $\quad 2RTiX_3 + C_4H_6 \rightarrow C_4H_6TiX_3\cdot + R\mathrm{-}R + TiX_3\cdot$ Equations D and E represent the formation of reaction products of the free radical catalyst $C_4H_6TiX_3\cdot$ by reaction with itself or with the $TiX_3\cdot$ free radical respectively.

(D) $\quad 2C_4H_6TiX_3\cdot \rightarrow TiX_3C_4H_6\mathrm{-}C_4H_6TiX_3$ (E) $\quad C_4H_6TiX_3\cdot + TiX_3\cdot \rightarrow TiX_3C_4H_6TiX_3$ When the butadiene reactant is not present in the prescribed mol excess during reaction of the organomagnesium compound and the titanium tetrahalide or special precautions such as maintenance of temperatures below 0° C. or the mixing of these reagents in a minimum 10 weight percent concentrated slurry have not been observed, the catalyst precursor $RTiX_3$ whose formation is shown in Equations A and B rapidly undergoes further reaction is shown in Equation F.

(F) $\quad 2RTiX_3 \rightarrow R_2 + (TiX_3)_2$

Equation F shows the conversion of the catalyst precursor $RTiX_3$ to a material containing titanium in a polymeric trivalent state which is completely inactive for cis-polybutadiene polymerization. When the organomagnesium compound is mixed with titanium tetrahalide and maintained in an inert hydrocarbon solvent at a temperature below 0° C. prior to the addition of the butadiene, reaction F is prevented from taking place to any substantial extent. On the addition of the butadiene to the reaction mixture, the active $C_4H_6TiX_3\cdot$ free radical catalyst is formed as shown in Equation C.

Similarly, if the concentration of organomagnesium compound and titanium tetrahalide in the hydrocarbon solvent is maintained above 10 and preferably above 15 weight percent of the total slurry, reactions A, B and F do not take place to any significant extent because of the lack of mobility of the reagents. On the addition of the butadiene reactant in the prescribed molar excess the active free radical catalyst is formed.

The conversion of an inactive reduced catalyst containing titanium essentially in a valence state below 4 by the action of an oxidizing agent in the presence of butadiene to a material which reacts with butadiene to form the active $C_4H_6TiX_3\cdot$ free radical catalyst by the action of an oxidizing agent is shown in Equation G.

(G) $\quad (TiX_3)_2 + I_2 \rightarrow 2TiX_3I$

The oxidizing agent oxidizes the polymeric titanium subhalide to the higher tetravalent state as shown in Equation G wherein iodine is used as the oxidizing agent. The resulting tetravalent titanium compound then reacts with butadiene and organomagnesium compound to form the active free radical catalyst.

The concentration of the oxidant necessary to convert the inactive titanium subhalide to the tetravalent state wherein it reacts with butadiene to form the acive catalyst is small relative to the btuadiene monomer concentration. An atmosphere of the inert gas containing oxygen equivalent to 25 to 200 parts per million based on the butadiene-solvent mixture provides the desired concentration of oxygen to effect the desired conversion. A concentration of halogen, preferably iodine, of approximately 1–10 weight percent of the concentration of the organomagnesium compound-titanium tetrahalide mixture is also adequate to effect conversion of the polymeric titanium subhalide to a state where it reacts with butadiene to form the active catalyst. Similar concentrations of hydroperoxides are also used to effect the desired conversion. In general the concentration of the oxidant should not exceed 80 mol percent of the titanium content of the inactive reaction mixture.

The butadiene reactant and solvents should be free from moisture, the maximum tolerable water content for high catalyst efficiency being 20 p.p.m. These materials should also be essentially free from sulfur, carbonyl groups and peroxides with the desired specifications for the first two being set at 10 p.p.m. maximum and for the peroxide 0 p.p.m. The acetylenic content of the butadiene should preferably not exceed 400 parts per million. Butadiene of the desired purity can be readily prepared by passage of peroxide-free monomer through drying agents such as molecular sieves or alumina, with or without prior distillation.

Hydrocarbon solvents employed in the process of this invention are usually aromatic hydrocarbons such as benzene, toluene, xylene and mixtures thereof. As indicated previously, a $C_3\text{-}C_6$ acyclic monoolefin is advantageously used in conjunction with the aromatic hydrocarbon. A mixture comprising 1 part of the aromatic hydrocarbon and 0.2 to 1.0 volume of $C_3\text{-}C_6$ monoolefin comprises a preferred solvent mixture for production of cis-polybutadiene employing the $C_4H_6TiX_3\cdot$ free radical catalyst in which titanium is essentially in the tetravalent state. Benzene-isobutylene and toluene-isobutylene mixtures constitute particularly preferred solvents for the process of the invention.

It is important that diethyl ether which is frequently employed as a solvent for the preparation of organomagnesium compound be absent from the solvent mixture. The necessity for maintaining the reaction mixture free of diethyl ether indicates the desirability of employing the process disclosed in commonly-assigned, copending application Ser. No. 255,196, filed Jan. 31, 1963 by W. Nudenberg, W. J. Heintzelman and V. A. Rolleri issued Aug. 2, 1966 as U.S. Patent 3,264,360 for preparing organomagnesium compounds which are free from ether solvents.

The polymerization process of this invention is effected at temperatures between −10 and 90° C. with temperatures between 0 and 75° C. being preferred. The wide temperature range over which the $C_4H_6TiX_3\cdot$ free radical catalyst prepared by reaction of butadiene, organomagnesium compound and titanium tetrahalide is effective is one of the advantages of the process of the invention. Rigid control of polymerization temperature is not required with this catalyst system.

The present polymerization process is not sensitive to pressure. Broadly speaking, pressures between atmospheric and 500 p.s.i.g. may be employed. The polymerization reaction is normally effected at sufficient pressure to maintain liquid phase conditions. Pressures between 30 and 150 p.s.i.g. are usually adequate to insure the desired liquid phase operation.

The polymerization reaction of the invention can be effected batchwise or in a continuous manner. Reaction is continued until 50% or more of the butadiene has been converted to polymer. The usual reaction times vary from 3 minutes to 10 or more hours; with the reaction temperature, the concentration and activity of the catalyst and the size of the polymerization reaction mixture all affecting the duration of the reaction.

After the polymerization reaction has resulted in 50–100% conversion of butadiene to polymer, the reaction is terminated by addition of a catalyst deactivating mixture. A typical reaction terminating solution comprises a benzene solution containing 0.5 to 2.0% of anti-oxidant per weight of diolefin polymer and 0.2 to 1.5 weight percent secondary amines such as dimethylamine to stabilize the polymer. The anti-oxidants employed for terminating the reaction are advantageously those which are added to rubber to enhance its anti-oxidant properties. Examples of anti-oxidants employed as reaction terminating reagents are N-phenyl N'cyclohexyl-p-phenylenediamine sold under the trade name "Flexone 6H"; a reaction product of diphenylamine and acetone sold under the trade name "BLE"; 2,6-di-t-butyl-4-methylphenol sold under typical trade names such as "Deenox" and "Ionol"; and styrenated phenols sold under the trade name "Wingstay S"; and 2,2'-methylene bis(4-methyl-6-tertiary butyl phenol) sold under the trade name "Antioxidant 2246."

An alternate novel process for terminating the polymerization reaction involves passage of carbon dioxide or ammonia through the reaction mixture with resultant deactivation of the $C_4H_6TiX_3 \cdot$ catalyst.

Cis-polybutadiene is recovered by one of the following procedures: (1) steam floccing (2) alcohol coagulation; (3) solvent evaporation; (4) conversion to latex.

The process of this invention for producing cis-polybutadiene using a $C_4H_6TiX_3 \cdot$ catalyst or a product thereof in which the titanium is essentially in the tetravalent state is illustrated in the following examples.

EXAMPLE 1

This example illustrates the ineffectiveness of an organomagnesium-titanium tetrahalide reaction product in which the titanium metal has been reduced to a valence state substantially below 4.

Ether-free dodecyl magnesium bromide and titanium tetraiodide were reacted in a mol ratio of 0.25 mol of dodecyl magnesium bromide to 0.12 mol of titanium tetraiodide in the following fashion: 275 cc. of 0.92 molar solution of dodecyl magnesium bromide in diethyl ether was added dropwise to a reaction vessel containing 1600 cc. of boiling dry xylene in an argon atmosphere. Addition of the ether solution of the Grignard to the hot xylene in this manner resulted in removal of ether by flashing. Distillation of the xylene was then continued until the total volume was reduced to approximately 500 cc. Sufficient benzene, which had been dried over molecular sieves, was added to bring the total volume of solution in the reaction vessel to 1500 cc. The resulting ether-free organomagnesium compound was a powdery solid readily dispersible in the benzene-xylene solvent to yield a fairly stable white suspension. 64 grams (0.115 mol) of finely-divided titanium tetraiodide was stirred into this suspension at a temperature between 20 and 30° C. to form a grayish suspension which gradually become dark black. The resulting organomagnesium compound-titanium tetraiodide reaction product appeared to be almost completely dissolved in the benzene-xylene solvent.

On addition of this reaction product containing titanium subhalide to a reactor containing 5 lbs. of purified (instrument grade) butadiene and 35 lbs. of dry benzene there was no evidence of initiation of a polymerization reaction. After the stirred reactor charge stood for two hours at a temperature between 20 and 25° C., an additional portion of a similar reaction product comprising 0.26 mol of dodecyl magnesium bromide and 0.114 mol of titanium tetraiodide was added and no indication of polymerization occurred in three hours.

EXAMPLE 2

This example illustrates the conversion of the inactive organomagnesium compound-titanium iodide reaction product of Example 1 to an active catalyst system by the action of an oxidizing agent in the presence of butadiene monomer. To the inert polymerization reaction mixture of Example 1 there was added 12 grams of iodine. Rapid polymerization took place immediately as evidenced by a 30° C. rise in temperature within 2–5 minutes after the iodine had been added. Reaction was terminated at this point by dumping the reactor charge into an argon swept vessel containing a benzene solution (1 litre) of 50 grams of Flexone 6H. Dimethylamine (anhydrous), 21 grams in 400 ml. of benzene solution and 500 ml. of ethyl alcohol were added to the reaction mixture which was stirred to assure intimate contact between the polymer cement, dimethyl amine, alcohol and anti-oxidant. Coagulation of the polymer was accomplished by addition of the cement to alcohol, after which the polymer was dried in a vacuum oven. The resulting polybutadiene comprised approximately 98% cis 1,4 structure with the remainder comprising trans and vinyl polymers in a ratio of 1 to 2.

EXAMPLE 3

This example illustrates the "in situ" preparation of the $C_3H_6TiX_3 \cdot$ free radical catalyst by reaction of organomagnesium compound, titanium tetraiodide and butadiene. This example also illustrates the use of isobutylene as a cosolvent with benzene in the reaction.

A ten gallon stainless steel reactor dried by distillation of benzene and purged with dry argon gas was charged in the order listed with 40 pounds of benzene (thiophene-free and azeotropic distillation), 12 pounds of butadiene dried over molecular sieves and 20.75 pounds of isobutylene dried by passing through alumina. The reactor charge was brought to 5° C., the agitator was started, and a suspension of 150 mmols of ether-free alpha-naphthyl magnesium bromide in 1 litre of xylene was transferred under argon pressure to the reactor. After five minutes of agitation a solution of 27 grams (48.6 mmols) of titanium tetraiodide dissolved in 3 litres of dry benzene was transferred to the reactor with argon pressure. The reaction mixture was brought to 13° C. and polymerization occurred immediately.

The total reaction time was 63 minutes, the percent solids at completion was 8.5 and the viscosity (cps.) at 13° C. was 2000. The polymer had a 98% cis 1,4 content, 0.5% trans, and 1.3% vinyl. The polymerization reaction was terminated at 63 minutes by dumping the charge into an argon flushed vessel containing 400 ml. of ethanol, 400 ml. of a 10% solution of dimethyl amine solution in benzene and 30 grams of Flexone 6H. A test portion of the polymer cement was coagulated and had an ML-4 at 212° F. of 54.

EXAMPLE 4

This example also demonstrates the "in situ" catalyst preparation employing a slightly higher mol ratio of organomagnesium compound to titanium iodide in the preparation of the catalyst. In this example, which also employs isobutylene cosolvent, the resulting polymer is very similar in properties to that obtained in Example 3.

To a moisture-free ten gallon reactor, previously flushed with argon, was added: benzene—40 pounds; butadiene—12 pounds; and isobutylene—20 pounds. The contents of the reactor were cooled to 5° C. A suspension of alpha-naphthyl magnesium bromide (160 mmols) in 1 litre of 30–70% xylene-benzene mixture was transferred to the reactor under argon pressure. Reactor contents were agitated for 5 minutes, 27 grams (48.6 mmols) of titanium tetraiodide dissolved in 2 litres of benzene were transferred to the reactor with argon pressure and the temperature was adjusted to 10° C. The course of the polymerization reaction was similar to that previously observed in Example 3. The reaction was terminated after 60 minutes and the charge dumped into an argon flushed vessel containing 900 ml. of 10% benzene dimethylamine solution, 800 ml. ethanol, and 60 grams of Flexone 6H. The following physical properties were found: percent solids, 10.4; viscosity (cps.) at 10° C., 3592; the polymer comprised 97% cis, 0.8% trans, and 2.0% vinyl contents. A test portion of the coagulated polymer cement had an ML-4 at 212° F. of 60.

EXAMPLE 5

This demonstrates "in situ" catalyst preparation and its use in a system which does not contain isobutylene as a cosolvent. In the absence of isobutylene the reaction mixture becomes highly viscous and because of poor heat transfer the reaction temperature increases considerably.

To a 5 gallon stainless steel reactor previously dried by distillation of xylene and flushed with argon was added 35 pounds of dried benzene and 6.0 pounds of butadiene.

The reactor charge was brought to 10° C. and 71.0 mmols of ether-free alpha naphthyl magnesium bromide in 900 ml. of xylene-benzene (30–70%) mixture was transferred to the reactor by argon pressure. The contents of the reactor were agitated for 10 minutes and then a solution of 22.9 mmols of titanium tetraiodide (12.75 grams) in 1 litre of benzene was transferred to the reactor. Immediately on adding the tetraiodide solution, the reaction proceeded exothermically with a 40° C. temperature rise in 10 minutes (under full refrigeration). In 15 minutes the reaction had proceeded to 50% conversion (Brookfield viscosity—194 centipoises). After 30 minutes of reaction time the conversion rose to 86%. The Brookfield viscosity was 15,250 cps. at 15° C.

The polymerization reaction was terminated at 30 minutes by placing the charge into an argon flushed vessel containing 400 ml. of ethanol, 400 ml. of 10% benzene dimethylamine solution and 15 grams of Flexone 6H. The polybutadiene was recovered from the solvent by steam floccing. It showed the following properties: Mooney viscosity at 212° F.—64, percent cis 1,4 content—97, percent trans 1,4 content—0.6, percent vinyl—2.0, dilute solution viscosity—2.73 and ash—0.2%.

EXAMPLE 6

This example illustrates premixing organomagnesium compound and titanium tetrahlide in a concentrated slurry in which these retactants constitute at least 10 weight percent prior to addition of butadiene. Mixing these reactants in a concentrated slurry prevents rapid reaction between the organomagnesium compound and the titanium tetrahalide to form the inactive titanium trihalide in which the titanium is essentially at a valence below 4.

A concentrated slurry of dodecyl magnesium bromide and titanium tetraiodide in a mol ratio of 2.2:1 was prepared by the following procedure: 200 cc. of 0.7 molar diethyl ethter solution of dodecyl magnesium bromide was added to a reaction vessel provided with a gas inlet and outlet for gas purging and with a distillation take off head. 800 cc. of anhydrous xylene was added, and the solution was heated at atmospheric pressure under an argon gas purge to remove an ether-xylene distillate, until the total volume in the flask was reduced to 200 cc. Further quantities of xylene were added and the distillation continued until the reaction mixture containing dodecyl magnesium bromide was ether-free. At this point, the reaction vessel contained approximately 200 cc. of solvent containing dodecyl magnesium bromide in the form of a semi-solid mass. After fitting the reaction vessel with a stirring device and providing a positive sweep of argon gas therethrough, the xylene suspension of dodecyl magnesium bromide was cooled to 25° C. Anhydrous peroxide-free benzene was then added to the suspension to bring the total volume to 800 cc., and the mixture was stirred for an additional 30 minutes to disperse the Grignard reagent. After cooling the reaction flask to 10° C., 0.064 mol of finely-divided titanium tetraiodide was added in four portions. This mixture was stirred for 30 minutes during which period a gelatinous mass formed, and the temperature was allowed to rise to 20° C. The gelatinous mass was converted to a fluid suspension, brownish-black in color. The organomagnesium compound and titanium iodide comprised a little more than 10 weight percent of the benzene-xylene concentrate.

The fluid suspension was transferred to a 5 gallon stainless steel reactor containing 35 pounds of benzene by applying argon pressure simultaneously with the introduction of butadiene gas. A total of 5.5 pounds of butadiene, which had been previously purified by passage through alumina, was added to the reactor on demand at its own vapor pressure and at room temperature. The rate of butadiene take-up by the polymerization reaction mixture was as follows: 1 pound in 65 minutes, 2.5 pounds total in 145 minutes, and 3 pounds in 170 minutes. The polymerization reaction mixture was continuously agitated. Cooling was accomplished by indirect heat exchange with flowing tap water. In 5.5 hours of reaction the temperature of the polymerization mixture had risen from 20 to 35° C. Addition of butadiene was continued for a total of 10 hours. The reaction mixture was then transferred by argon pressure into an argon-purged stainless steel vessel containing a benzene solution of 25 grams of Flexone 6H, the concentration of said anti-oxidant being approximately 1% of the polymer formed. The vessel containing the anti-oxidant solution also contained 400 cc. of a benzene solution containing 5.8 weight percent of dimethylamine and 500 cc. of ethyl alcohol. After stirring to effect intimate contact between the alcohol, dimethylamine "stabilizer," the anti-oxidant and the polymer, there was obtained by alcohol coagulation 4.1 pounds of dry butadiene polymer. The polybutadiene had the following structural composition: cis-1,4 content—99%, with the remainder comprising equal parts of trans and vinyl polymers. Further analysis of this polymer showed the following properties:

| | |
|---|---|
| Gel content _____percent__ | 0.0 |
| Carbon and hydrogen analysis, percent respectively _____ | 88 and 11 |
| Ash content _____percent__ | 0.26 |
| Raw Mooney at 100° C. _____ | 68 |
| TR–10 (ASTM D–1359–58T) _____° C__ | −22 |
| Temperature of transition _____° F__ | 125 |

EXAMPLE 7

This example shows the evaluation of the butadiene polymer produced in Example 6 as a tire component. A portion of the polymer cement produced in Example 6 was coagulated by addition to 10 times its volume of ethyl alcohol. A discrete, fine particle crumb was obtained by vigorous agitation of the alcohol coagulant. The crumb was washed three times and dried in a vacuum oven for 15 hours at 50° C. A portion of this material was treated with 1 weight percent BLE on a mill and the resulting polymer prepared for further testing. This material was compounded and vulcanized in accordance with the following recipe:

| | Parts |
|---|---|
| Polybutadiene _____ | 100 |
| Philblack O (high abrasion furnace black) _____ | 50 |
| ZnO _____ | 5 |
| Stearic acid _____ | 2 |
| Resin 731D (dehydroabietic acid) _____ | 10 |
| MBT (mercaptobenzothiazole) _____ | 1 |

This masterbatch was prepared by incorporating the ingredients on a cold mill, that is, at a temperature less than 68° F., after which the mill temperature was raised from 225–250° F. for 5–10 minutes, after which it was allowed to cool to room temperature. The resulting masterbatch was split into three portions identified as A, B and C, respectively. Masterbatch A was compounded with 1.07 grams of sulfur per 100 grams of masterbatch. Masterbatch B was compounded with 1.19 grams of sulfur per 100 grams of masterbatch and Masterbatch C was milled with 1.31 grams of sulfur per 100 grams of masterbatch. Three test pieces were prepared from each of Masterbatches A, B and C by heating in a press at 293° F. for 30, 40 and 50 minutes, respectively. In addition to these standard test pieces, samples for the Goodrich Flexometer Test were also cured. The results on the different masterbatches cured for different periods of time are shown in Table I.

The properties of the vulcanized high cis content polybutadiene indicate it to be equivalent or better than commercially accepted general purpose elastomers. An outstanding property of the vulcanized cis-polybutadiene is its low heat build-up characteristic as shown in the data in Table I.

EXAMPLE 10

This example demonstrates the effect of the variation of the mol ratios of the catalyst components on the composition of the polybutadiene.

A catalyst precursor was prepared by reacting 258 millimols of ether-free lauryl magnesium bromide and 147.5 millimols of titanium tetraiodide (mol ratio 1.75 to 1) by the procedure outlined in Examples 8 and 9. Butadiene was polymerized with an aliquot of this catalyst containing 25 millimols of organomagnesium by a procedure similar to that outlined in Example 8. The resulting polybutadiene isolated from the reaction mixture contained gel and had an 86% cis content with the remainder comprising 4.5% trans 1,4 content and 1% vinyl content. Gelled polymers usually are low in unsaturation.

TABLE I

| Cure Time | A | | | B | | | C | | |
|---|---|---|---|---|---|---|---|---|---|
| | 30' | 40' | 50' | 30' | 40' | 50' | 30' | 40' | 50' |
| Scott Tensile (p.s.i.) | 3,200 | 3,150 | 3,150 | 2,900 | 2,800 | 2,950 | 2,800 | 3,100 | 2,750 |
| 300% Modulus (p.s.i.) | 950 | 1,175 | 1,200 | 1,200 | 1,300 | 1,400 | 1,250 | 1,400 | 1,400 |
| Elong. at Break, percent | 580 | 515 | 510 | 500 | 440 | 430 | 500 | 490 | 450 |
| Goodrich Temp. Rise, ° F.[1] | 55 | 50 | 42 | 54 | 47 | 42 | 53 | 43 | 40 |
| Abs. Hys. Rm. Temp.[2] | 11.10 | 11.45 | [3] | 11.26 | 11.41 | [3] | 11.10 | [3] | [3] |
| Abs. Hys. 280° F.[2] | 3.30 | 3.39 | 3.09 | 3.39 | 3.30 | 3.10 | 3.46 | 3.35 | 3.20 |
| Hys. Mod. 280° F.[2] | 12.20 | | 12.80 | 14.20 | 14.50 | 13.85 | 13.40 | 13.65 | 13.25 |

[1] ASTM D-623-58T Method A, 143 p.s.i. Load, 0.175 in stroke at 100° F.
[2] Hysteresis was determined in torsion resonance type system at a frequency range of 0.5 to 5° cycle per second. The temperature of the hysteresis modulus is 280° F.
[3] Stiff.

Examples 8 and 9 show the effectiveness of catalysts obtained by reaction of organomagnesium compounds of varying alkyl chain length with titanium tetraiodide and butadiene. In these runs, reduction of the premixed organomagnesium compound-tetrahalide mixture to an inactive titanium trihalide prior to the addition of the butadiene was prevented by maintaining the mixture at a temperature below 0° C.

EXAMPLE 8

A mixture of butyl magnesium bromide and titanium tetraiodide, which can be considered a catalyst precursor, was prepared by mixing 25 millimols of ether-free butyl magnesium bromide and 11.2 millimols of titanium tetraiodide under an inert atmosphere in a mixed xylene-benzene solvent at a temperature of −10° C. The catalyst was then mixed at atmospheric pressure (under inert gas) with 250 cc. of butadiene and 400 cc. of benzene in a one-liter flask at −10° C. In 5 hours, 25% conversion of the butadiene was obtained and a polybutadiene having a cis content over 97% and the characteristics shown in Table II were isolated.

EXAMPLE 9

A catalyst precursor was prepared by reacting 12.5 millimols of ether-free decyl magnesium iodide and 5.6 millimols of titanium tetraiodide at a temperature of −10° C. in a mixed xylene-benzene solvent. The catalyst was then reacted at atmospheric pressure with 150 grams of butadiene dissolved in 400 cc. of benzene at a temperature of −10° C. (under inert gas). A polybutadiene having a cis content over 98% and with the properties shown in Table II was isolated from the reaction mixture.

TABLE II

| | Example 8 | Example 9 |
|---|---|---|
| Trans | 0.7 | 0.8 |
| Vinyl | 2.0 | 0.5 |
| Gel | 0 | ([1]) |
| DSV | 2.33 | 2.83 |
| Ash | 0.43% | |

[1] Trace.

A catalyst precursor resulting from reaction of ether-free lauryl magnesium bromide and titanium tetraiodide in a mol ratio of 2 to 1 at a temperature of −10° C. was utilized for butadiene polymerization employing the same reaction conditions. The resulting butadiene polymer isolated from the reaction mixture contained a cis content of 99% with the remainder comprising 1 part trans and 2 parts vinyl isomers.

This example shows the necessity of employing a mol ratio of organomagnesium halide to titanium tetraiodide of 2:1 or over in catalyst preparation in order to produce a polybutadiene with a cis content over 90%.

EXAMPLE 11

This example illustrates the production of a polybutadiene employing an iodine-free catalyst.

Dodecyl magnesium bromide and titanium tetrachloride were mixed in a solvent by the procedure outlined in Example 8, i.e. by maintaining the temperature below 0° C. prior to the addition of the butadiene reactant necessary to prepare the active catalyst $C_4H_6TiX_3$. The catalyst employed in Run A was prepared using dodecyl magnesium bromide and titanium tetrachloride in a mol ratio of 1:2 and the catalyst employed in Run B was prepared using these components in a mol ratio of 2:1. When these catalysts were employed for polymerizing butadiene by the procedure of Example 8, the following results were obtained: In Run A, the resulting polybutadiene comprised 3% cis content and 97% trans content. In Run B, conducted under similar conditions, the resulting polybutadiene contained 61% cis content and 37% trans content, with the remainder comprising mainly the vinyl isomer. This example shows that an iodine-free catalyst mixture results in the cis content of the polybutadiene dropping below the 90% level.

EXAMPLE 12

This example demonstrates the preparation of a high cis content polymer using a catalyst precursor prepared by reaction of an iodine-containing organomagnesium compound and titanium tetrachloride.

A catalyst precursor was prepared by reacting, in an inert atmosphere, 12.5 millimols of ether-free decyl magnesium iodide and 5.6 millimols of titanium tetrachloride by mixing in a solvent below 0° C. The catalyst obtained on butadiene addition was employed for polymerization of butadiene under the conditions outlined in Example 8; a polymer was produced containing 92% cis content with the remainder comprising trans and vinyl content in a ratio of 5:1.

This example was repeated with a catalyst precursor prepared from methyl magnesium iodide and titanium tetrachloride and a polybutadiene having an essentially similar composition was produced.

This example provides further proof of the wide flexibility of the catalyst system of the invention.

EXAMPLE 13

This example illustrates the use of a catalyst prepared by reaction of titanium tetrahalide, butadiene and an aryl organomagnesium compound in the polymerization of butadiene.

An active catalyst precursor was prepared by the concentrated slurry procedure outlined in Example 6. This catalyst precursor was prepared by the reaction of 259 millimols of ether-free alpha-naphthyl magnesium bromide and 115.5 millimols of titanium tetraiodide in an inert atmosphere. The catalyst concentrate containing above 10 weight percent of these reagents was charged into a reactor containing 35 pounds of benzene and 5.5 pounds of butadiene at 5° C. The active catalyst $C_4H_6TiX_3$· was formed immediately and a highly exothermic polymerization immediately occurred resulting in a temperature rise of 65° C. in a period of 10 minutes even though the reactor was cooled by a full flow of coolant during this period. Essentially 100% conversion was obtained in the 10-minute period with the formation of a polymer having a cis content of 90% with the remainder comprising trans and vinyl isomers in about equal amounts. This polymer, which had a gel content of 0, had a dilute solution viscosity of 1.47 and an ML–4 at 100° C. of 10.

The enhanced catalytic activity of a catalyst precursor prepared from an aryl Grignard and titanium tetraiodide is shown by the very rapid polymerization rate and by the decreased Mooney value of the polymer.

When the catalyst concentration was reduced to about ½ of that employed in the above example, a less rapid polymerization reaction was obtained and the resulting polymer had a higher cis content and a Mooney viscosity value in a more conventional range. Specifically, when the same alpha naphthyl magnesium bromide-titanium tetraiodide catalyst precursor was added to the butadiene containing reaction mixture in a concentration of ½ of that employed above, the resulting polymer had a cis content of 98% with the remainder comprising 1 part trans and two parts vinyl isomer; the polybutadiene had an ML–4 at 100° C. of 89.

EXAMPLES 14–18

These examples illustrate the preparation of active catalyst by the reaction of dihydrocarbyl magnesium compounds, excess butadiene monomer and titanium tetrahalide. The dihydrocarbyl magnesium compounds prepared directly from alkyl or aryl halide and magnesium in the absence of ether as described in the afore-identified copending application Ser. No.255,196 are hydrocarbon-soluble compounds. High catalyst efficiencies are observed when the dihydrocarbyl magnesium compounds are reacted with titanium tetrahalide and butadiene monomer. When dihydrocarbyl magnesium is reacted with the titanium tetrahalide in dilute solution, that is, in the absence of butadiene, no polymer is formed on the subsequent addition of butadiene.

In Table III data are shown illustrating the use of five different dihydrocarbyl magnesium compounds. Benzene (100 ml.) dried over alumina was treated with 20 ml. (12 grams) of butadiene in a nitrogen blanketed capped pop bottle. Dihydrocarbyl magnesium, 0.225 millimol (1.5 ml. of 0.15 molar solution in benzene) was added through the self-sealing cap on the bottle to the butadiene benzene solution. The subsequent addition of 0.15 millimol of titanium tetraiodide solution (7.5 ml. of 0.2 molar solution in benzene) caused a rapid exothermic polymerization with a temperature increase of about 35° C. The data in Table III show the results obtained on polymerizations initiated at 27° C. which were permitted to run for one hour before work up. The polymers were recovered from the benzene by coagulation with alcohol in the presence of antioxidant 2246.

TABLE III.—DIHYDROCARBYL MAGNESIUM COMPOUNDS, BUTADIENE TITANIUM TETRAHALIDE SYSTEM AS INITIATOR FOR BUTADIENE POLYMERIZATION

| Example number | 14 | 15 | 16 | 17 | 18 |
|---|---|---|---|---|---|
| Dihydrocarbyl Magnesium Compound | (1) | (2) | (3) | (4) | (5) |
| Conversion, percent | 100 | 99 | 93 | 98 | 99 |
| Cis 1,4, percent | 96 | 96.3 | 96.0 | 96.5 | 96.0 |
| Trans 1,4, percent | 1.2 | 1.4 | 1.2 | 1.3 | 1.2 |
| Vinyl, percent | 1.8 | 2.3 | 3.0 | 2.2 | 3.0 |

1 Di-n-decyl.
2 Di-phenyl.
3 Di-metatolyl.
4 Di-p-tolyl.
5 Di-α-naphthyl.

EXAMPLE 19

This example illustrates the ineffectiveness of a dihydrocarbon magnesium compound-titanium tetraiodide reaction product as a catalyst precursor when these reactants are present in a dilute hydrocarbon solution containing approximately 1 weight percent of reactants. There was prepared a reaction mixture containing 0.225 millimol of diphenylmagnesium and 0.168 millimol of titanium tetraiodide in 10.3 ml. of benzene. This mixture, which contained approximately 1 weight percent of diphenylmagnesium-TiI$_4$, was added to a nitrogen-blanketed pop bottle containing 24 grams of butadiene and 200 ml. of benzene. There was no observable reaction after 24 hours of shaking, indicating that the diphenylmagnesium compound and titanium tetraiodide had reacted in dilute benzene solution to form titanium trihalide in which the titanium was essentially in a valence state below 4.

When the same quantity, namely, 0.225 millimol, of diphenylmagnesium was added to a mixture comprising 24 grams of butadiene and 200 ml. of benzene and 0.168 millimol of TiI$_4$ added thereto, rapid exothermic polymerization immediately took place and there was obtained results essentially similar to those obtained in Example 15. There was 100% conversion of the butadiene to a polymer comprising approximately 97% cis 1,4 isomer, 1% trans and 2% vinyl polymer.

EXAMPLE 20

This example illustrates that under the conditions employed in Examples 14–18 the soluble dihydrocarbyl magnesium compounds R$_2$Mg make more efficient catalysts than the insoluble organomagnesium halides (Grignard). Table IV shows the effect of diphenylmagnesium and phenylmagnesium chloride on butadiene polymerization carried out according to the procedure described in Examples 14–18.

TABLE IV.—EFFECT OF ORGANOMAGNESIUM COMPOUNDS ON CIS 1,4 POLYBUTADIENE INTRINSIC VISCOSITY

| Organomagnesium Compound | Conversion, Percent | Cis 1,4, Percent | Intrinsic Viscosity |
|---|---|---|---|
| Diphenylmagnesium | 95 | 97 | 1.78 |
| Phenylmagnesium chloride | 95 | 97 | 2.23 |

The lower intrinsic viscosity with the diphenylmagnesium shows that the soluble compound causes higher catalyst efficiency resulting in the formation of lower molecular weight polymer.

EXAMPLE 21

This example shows the effect of ether-free dihydrocarbyl magnesium and titanium tetrahalide concentration on molecular weight or Mooney viscosity of cis-1,4 polybutadiene made with the catalyst having the titanium essentially in the tetravalent state. Table V shows 10 gallon reactor runs employing the active catalyst prepared from diphenylmagnesium, butadiene, and titanium tetraiodide. A 10 gallon stainless steel reactor provided with means for circulating refrigerant through the reactor jacket was dried by distillation of benzene followed by a nitrogen flush. The reactor was then charged with benzene, dried by passage through alumina and butadiene (polymerization grade, dried and freed from inhibitor by passage through alumina). The charge quantities are shown in Table V. The reactor was maintained under a positive pressure of nitrogen. Diphenylmgnesium (prepared under ether-free conditions) in benzene solution was transferred to the butadiene benzene solution by means of a nitrogen pressurized stainless steel bomb. The agitator was started, the reactor temperature brought to 25° C. and titanium tetraiodide solution (0.2 molar) added by means of a pressurized stainless steel bomb. The quantity of tetraiodide shown in the table, when added in one shot, caused a rapid and exothermic reaction to occur, such that full cooling could not hold the temperature constant (21–A). Easy control of the reaction to maintain constant temperature, however, was readily accomplished by incremental tetraiodide addition (21–B). The polymers shown in Table V were treated with antioxidant and then steam flocced.

TABLE V.—EFFECT OF DIPHENYLMAGNESIUM AND TITANIUM TETRAIODIDE LEVEL ON MOLECULAR WEIGHT

| Run number | 21-A | 21-B |
|---|---|---|
| Benzene (grams) | 26,604 | 26,604 |
| Butadiene (grams) | 3,632 | 3,632 |
| Diphenylmagnesium millimols (g.) | 55 (9.8 g.) | 42 (7.5 g.) |
| Titanium Tetraiodide millimols | 36.7(20.4) | 24(13.3) |
| Temperature, °C | 25 to >75 | 10 to 50 |
| Time, minutes | 60 | 40 |
| Conversion, Percent | 100 | 100 |
| Intrinsic Viscosity | 2.05 | 3.39 |
| Mooney Viscosity at 212° F | 26 | 84 |
| Cis 1,4 content, Percent | 95.4 | 96.2 |
| Trans 1,4 content, Percent | 2.0 | 1.7 |
| Vinyl, Percent | 2.6 | 2.1 |
| Compound ML–4 | 54 |  |
| 300% Modulus 90' | 1,180 | 1,350 |
| Tensile 90' | 2,220 | 1,800 |
| Elongation 90' | 470 | 460 |
| ΔT 90' | 46 | 40 |
| Recipe [1] (Banbury Mixing): |  |  |
| Cis-BR | 100 |  |
| HAF Black | 50 |  |
| Zinc Oxide | 3.0 |  |
| Stearic Acid | 2.0 |  |
| Flexamine | 1.0 |  |
| Resin 731D | 5.0 |  |
| Philrich 5 | 5.0 |  |
| Sulfur | 1.75 |  |
| NOBS #1 | .91 |  |

[1] Cured at 293° F. for 90 minutes.

Obviously, many modifications and variations of the invention as hereinbefore set forth may be made without departing from the spirit and scope thereof and, therefore, only such limitations should be imposed as are indicated in the appended claims.

What is claimed is:

1. A process for preparing polybutadiene of controlled 1,4 structure and configuration which comprises contacting substantially anhydrous butadiene for polymerization in an aromatic hydrocarbon solvent medium, said solvent medium being inert to polymerization, said contact being at a temperature between —10° C. and 90° C. with an organomagnesium Grignard composition catalyst which forms on contact of butadiene, titanium tetrahalide and an ether-free organomagnesium Grignard composition, wherein the hydrocarbyl radical of said organomagnesium composition contains 1 to 30 carbon atoms, and the halogen of said organomagnesium composition is selected from the group consisting of bromine, iodine and chlorine, said active catalyst being freshly formed of said organomagnesium composition, said titanium tetrahalide in a mol ratio of 1:10 to 10:1, and butadiene to give an active fresh hydrocarbyl-titanium halide-butadiene complex catalyst, wherein the titanium is thereby actively maintained in the tetravalent state in the polymerization of butadiene.

2. A process according to claim 1, in which said catalyst is formed by the separate addition of the organomagnesium compound and titanium tetrahalide to butadiene.

3. A process according to claim 1, in which contact of butadiene for polymerization with said catalyst is effected at a temperature between 0° C. and 50° C.

4. A process according to claim 1, in which said titanium tetrahalide is substituted with at least 1 iodine atom and said organomagnesium compound is selected from the group consisting of aliphatic and aryl hydrocarbyl magnesium compounds containing bromine and iodine in which the hydrocarbyl radical contains 6 to 24 carbon atoms.

5. A process according to claim 1, in which polymerization of butadiene with said catalyst is effected in the presence of an oxidizing agent soluble in said hydrocarbon medium.

6. A process according to claim 1, in which the solvent medium includes a $C_3$–$C_6$ monoolefinic cosolvent in amount to five times the butadiene concentration.

7. A process for preparing polybutadiene having a cis 1,4 content above 90% which comprises contacting butadiene in an aromatic hydrocarbon medium including a $C_3$–$C_6$ monoolefinic cosolvent in amount to five times the butadiene concentration at a temperature between —10° C. and 90° C. with an iodine-containing catalyst formed by contact of titanium tetrahalide with an ether-free organomagnesium Grignard composition in the presence of butadiene, wherein the hydrocarbyl radical of said organomagnesium Grignard composition contains 1 to 30 carbon atoms and the halogen of said organomagnesium composition is selected from the group consisting of bromine, iodine and chlorine, said catalyst containing said organomagnesium composition and said titanium tetrahalide in a mol ratio between 2:1 and 10:1 being freshly formed with butadiene to give an active fresh hydrocarbyltitanium halide-butadiene complex catalyst, whereby the titanium is actively maintained in the tetravalent state in the polymerization.

8. A process according to claim 7, in which iodine is present in said catalyst in the titanium tetrahalide component.

9. A process according to claim 7, in which the iodine is present in said catalyst in said organomagnesium compound.

10. A process according to claim 7, in which said catalyst is formed in said polymerization reaction mixture in a concentration between 0.00001 to 0.01 mol of catalyst per mol of butadiene.

11. A process according to claim 7, in which said catalyst comprises titanium tetraiodide and an ether-free organomagnesium composition selected from the group consisting of aliphatic and aryl hydrocarbyl magnesium compounds containing bromine, and iodine, in which the hydrocarbyl radical contains 6–24 carbon atoms.

12. A process according to claim 1, in which said organomagnesium compound and titanium tetrahalide are freshly mixed in a concentration of at least 10 weight percent in an inert hydrocarbon solvent prior to contact with butadiene monomer.

References Cited

UNITED STATES PATENTS

| | | | |
|---|---|---|---|
| 2,977,349 | 3/1961 | Brockway et al. | 260—94.3 |
| 3,004,018 | 10/1961 | Naylor | 260—94.3 |
| 3,037,971 | 6/1962 | Beermann et al. | 260—94.3 |
| 3,065,220 | 11/1962 | McManimie et al. | 260—94.3 |
| 3,066,128 | 11/1962 | Youngman | 260—94.3 |
| 3,070,587 | 12/1962 | Zelinski | 260—94.3 |
| 3,117,984 | 1/1964 | Beermann et al. | 260—429.5 |
| 3,118,864 | 1/1964 | Robinson et al. | 260—94.3 |
| 3,177,183 | 4/1965 | Naylor et al. | 260—94.3 |
| 3,178,402 | 4/1965 | Smith et al. | 260—94.3 |
| 3,182,052 | 5/1965 | Naylor | 260—94.3 |
| 3,205,213 | 9/1965 | Stearns et al. | 260—94.3 |
| 3,206,447 | 9/1965 | Zelinski | 260—94.3 |

FOREIGN PATENTS 1,292,465   3/1962   France.

OTHER REFERENCES

Dolgoplosk et al.: Akad., Nauk SSSR, vol. 115, 1957, pp. 731–3.

Furukawa et al.: J. Chem. Soc. Japan, Ind. Chem. Sect. 61, 1353–9 (1958).

Gaylord et al.: Linear and Stereoregular Addition Polymers, Interscience, New York, 1959, pp. 168–185 and 321.

Erusalinskii et al.: J. Pol. Sci., 53, August 1961, pp. 27–32.

JOSEPH L. SCHOFER, *Primary Examiner.*

H. W. WONG, JR., *Assistant Examiner.*

U.S. Cl. X.R.

252—429, 431; 260—41, 79.5